United States Patent [19]
Bussin et al.

[11] Patent Number: 5,293,152
[45] Date of Patent: Mar. 8, 1994

[54] VEHICLE OSTACLE DETECTOR AND ALARM SYSTEM

[76] Inventors: George N. Bussin; Dentcho S. Sivov, both of 2934 Tyler Ct., Simi Valley, Calif. 93063; Roy L. Nembaard, 17063 Mindora Ct., Granada Hills, Calif. 91344

[21] Appl. No.: 833,151
[22] Filed: Feb. 10, 1992
[51] Int. Cl.$^5$ .............................................. B60Q 1/00
[52] U.S. Cl. .................................... 340/435; 340/437; 340/436; 340/596; 340/665; 200/61.42; 200/61.44
[58] Field of Search ............................... 340/435–437, 340/665, 596, 595; 200/61.41–61.44; 116/28 A, 28 R

[56] References Cited
U.S. PATENT DOCUMENTS
4,855,736 8/1986 Hsu ........................................ 340/436

Primary Examiner—Donnie L. Crosland
Attorney, Agent, or Firm—Albert O. Cota

[57] ABSTRACT

A vehicle obstacle detector (10) that is designed to alert the driver of a motor vehicle that the vehicle has encountered an obstacle. The detector (10) consists of an obstacle detector assembly (12) that includes a front probe (14) having a cavity (14b) that houses a piezoelectric element 14c. The probe (14) is attached to a flexible housing (16) that can be attached by means of a clamp (20) to the curb side of a vehicle or alternatively, the detector can be mounted to a wall (60) of a structure. The probe (14) produces electrical oscillations when the probe touches or scrapes against an obstacle. The oscillations are applied to an electronics control unit (30) that subsequently produces an alarm signal that energizes a visual and/or an audio alarm. The alarm may be located in the cab of a vehicle or on the wall when a wall mounted assembly (12) is employed.

11 Claims, 4 Drawing Sheets

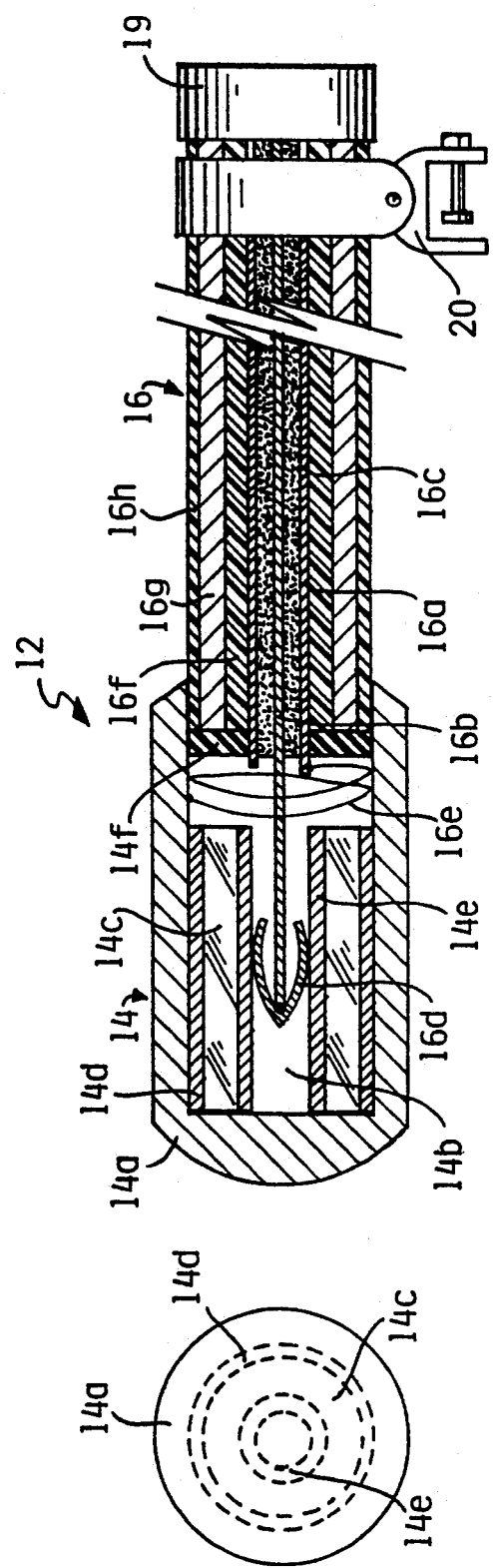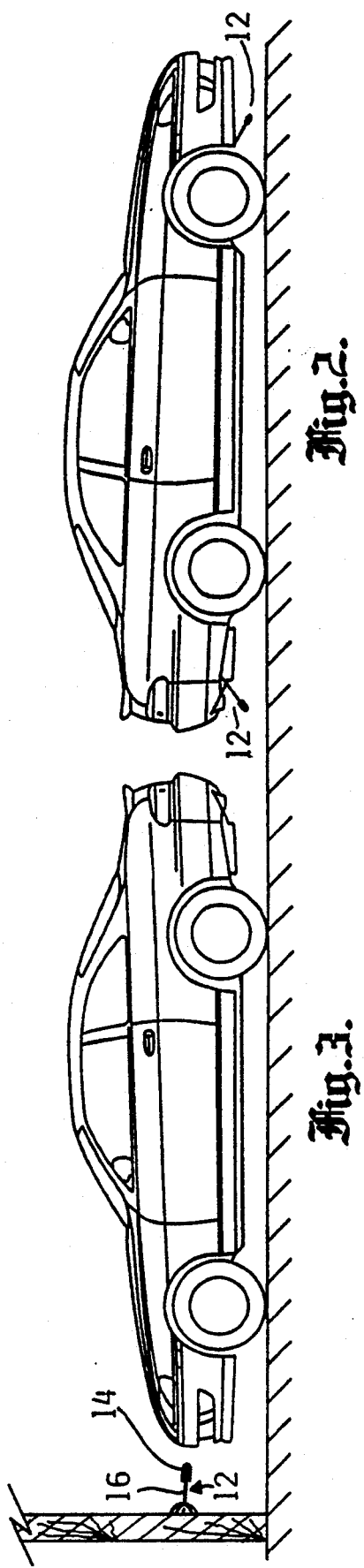

VEHICLE OSTACLE DETECTOR AND ALARM SYSTEM

TECHNICAL FIELD

The invention pertains to the general field of obstacle detectors and alarm systems more particularly to such a system that functions as a curb and obstacle detector and alarm system for use on motor vehicles.

BACKGROUND ART

Mechanical and electrical vehicle obstacle detectors and particularly curb detectors, have been in use for a long period of time. The curb detectors which are used primarily to facilitate parking a vehicle generally employ a flexible probe that is attached near the front and back wheels of the vehicle. The probes are adjusted to rub against an obstruction, such as a street curb, with a predetermined clearance between the obstruction and the vehicle.

Mechanical curb detectors alert a driver that an obstacle has been reached when a rubbing noise, made by the curb detector, is heard by the driver by mechanical transmission. When electrical/electronic detectors are used, an electrical signal is produced when the curb detector strikes or scrapes against an obstacle such as a curb. The generated signal operates a lamp and/or a buzzer located in the vehicle's driving compartment to alert the driver that an obstacle has been encountered.

A search of the prior art did not disclose any patents that read directly on the claims of the instant invention. However, the following U.S. patents were considered related:

| U.S. PATENT NO. | INVENTOR | ISSUED |
| --- | --- | --- |
| 4,967,180 | Wang | 30 October 1990 |
| 4,904,894 | Henry | |
| 4,870,868 | Gastgeb | 3 October 1989 |
| 4,855,736 | Hsu | 8 August 1989 |

The Wang patent discloses a pre-impact alarm apparatus that signals the driver of a motor vehicle that obstacles exist in the path of the vehicle when the vehicle is backing-up. The alarm apparatus consists of a flexible sensing bar that projects from the rear of the vehicle. The bar includes an electrical impact head that is electrically attached to a buzzer located within the vehicle. When the sensing bar impacts an obstacle, the impact head closes a set of contacts that energizes the buzzer.

The Henry patent discloses a hail sensor that uses a plurality of piezoelectric transducer positioned to produce an output signal when it is vibrated by a hailstone. The transducer output is supplied to a conventional signal processing circuit such as peak detectors and counters, which detect the electrical signal produced by the transducers.

The Gastgeb patent discloses a sensing device which produces a response when the point of impact between an object and a member occurs at a preselected location on the member. The sensing apparatus includes a piezoelectric sensor that produces an oscillatory electrical signal which is proportional to the vibration in the member generated by the collision between the object and the member. Appropriate circuitry is provided for analyzing the oscillatory electrical signal and for producing a response if the object impacted the member at a preselected location.

The Hsu patent discloses an electronic parking sensor apparatus having a base for attaching to a vehicle. The apparatus includes a flexible probe for contacting an impending obstacle. The probe is electrically attached to an electronics alarm unit that includes a filter circuit, an alarm circuit and is equipped with a pair of 1.5 volt cells that supplies the power to the alarm unit. The filter includes a timer for activating the alarm circuit when the electrical signal continues beyond a first interval which varies between 0.05 to 1.0 seconds. The timer also prevents activation of the alarm unit beyond a second longer interval that varies between 10 to 40 seconds. Separate front and rear transmitter units can operate on different signal frequencies for separately indicating front and rear contact with the obstruction.

DISCLOSURE OF THE INVENTION

The obstacle detector and alarm system is designed to alert the driver of a vehicle that the vehicle has encountered an obstacle. Thus, the driver can take an evasive action to prevent a further impact.

The system consists of two major elements: an obstacle detector assembly and an electronics control unit that is connected to the assembly by means of a cable assembly. The obstacle detector assembly consists of a front probe that includes an impact head that houses a piezoelectric element that functions as a mechanical/electrical transducer. The front probe is integrally attached to a flexible and protected housing that has a means for being attached to the curb side of a vehicle or the wall of a structure such as a parking garage or stall. In either mounting scheme, whenever the impact head touches or scrapes against an obstacle, the piezoelectric element produces a series of electrical pulses that are applied to the electronics control unit via a cable assembly that is preferably integrally attached to the back end of the housing.

The electronics control unit consists of a single enclosure that has a connector for receiving the cable assembly connected to the obstacle detector assembly. the electronics control unit consists of five major circuits: an amplifier circuit, a comparator circuit, a retriggable multivibrator, an audio generator circuit and an alarm circuit.

The amplifier circuit receives, processes and amplifies the electrical pulses provided by the impact head and produces an output signal that is applied to the comparator circuit. The comparator circuit compares the voltage level of the input signal with a preset threshold voltage. If the input signal is equal to or greater than the threshold voltage level, the comparator circuit is energized and produces a string of digital signals which are then applied to the multivibrator circuit. The multivibrator circuit includes an R-C time constant circuit that sets the pulse rate of the output pulses produced by the multivibrator that are then applied to the alarm circuit.

The alarm circuit receives both the output pulses from the multivibrator circuit and a series of audio frequency pulses produced by the audio generator circuit. The alarm circuit is designed to produce both a visual signal and an audio signal that energize a visual and an audio alarm respectively. When either alarm is energized, the driver of the vehicle is alerted that the impact head has encountered a vehicle.

In view of the above disclosure, it is the primary object of the invention to produce an obstacle detector and an alarm that is easily attached to a vehicle and that produces an alarm when the vehicle has encountered an obstacle.

It is also an object of the invention to provide an obstacle detector and alarm system that:
  can be used in both dry and inclement weather,
  uses an impact head that is omnidirectional and that produces an output signal when the head touches or scrapes against an obstacle,
  can be attached to the wall of a structure,
  is adaptable for use on power or sail boats,
  is reliable with no or very little maintenance, and
  is cost-effective from both a consumer and manufacturers point of view.

These and other objects and advantages of the present invention will become apparent from the subsequent detailed description of the preferred embodiment and the appended claims taken in conjunction with the accompanying drawings.

DESCRIPTION OF THE DRAWINGS

FIG. 2 is a side elevational view of a vehicle having an obstacle detector assembly attached to its lower rear side and lower front side.

FIG. 3 is a side elevational view of an obstacle detector and alarm system mounted to a wall of a structure showing the obstacle detector assembly before it is encountered by a vehicle.

FIG. 4 is a side sectional view of the obstacle detector assembly.

FIG. 5 is a front view of the obstacle detector assembly.

BEST MODE FOR CARRYING OUT THE INVENTION

The best mode for carrying out the invention is presented in terms of a preferred embodiment that is designed to alert a driver of a vehicle, by means of an alarm, when the vehicle has encountered an obstacle.

Figure 1:
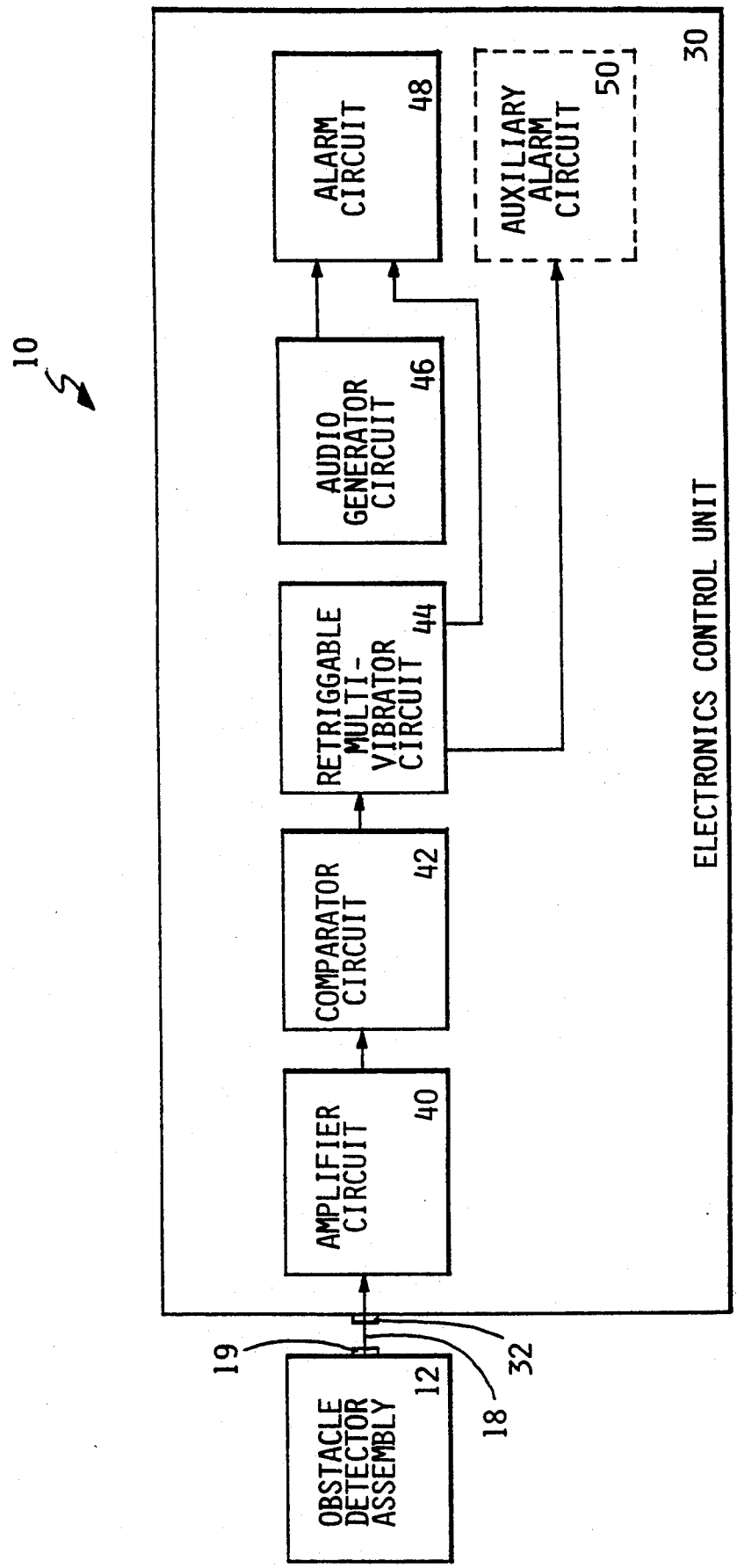
FIG. 1 is a block diagram of the obstacle detector and alarm system.

The preferred embodiment of the vehicle obstacle detector and alarm system 10 as shown in FIG. 1, is comprised of the following major elements: an obstacle detector assembly 12 and an electronics control unit 30 consisting of an amplifier circuit 40, a comparator circuit 42, a retriggable multivibrator 44, an audio generator circuit 46 and an alarm circuit 48.

The vehicle obstacle detector and alarm system 10 is primarily designed to allow at least one flexible obstacle detector assembly 12 to be adjustably mounted by means of a clamp or the like near the front and/or back curb side of a motor vehicle. The assembly is mounted in a plane that allows the assembly to touch or scrape against a street curb as shown in FIG. 2. Alternatively, the obstacle detector assembly 12 and the electronics control unit 30 can be mounted to a wall 60 of a structure with the assembly 12 elevated to encounter the front or back of a vehicle as shown in FIG. 3. In this mounting scheme, the alarm circuit 48 can be made and mounted as a separate unit or be an integral element of the electronics control unit 30.

The flexible obstacle detector assembly 12 as shown in FIGS. 4 and 5, is comprised of a front probe 14 that includes an impact head 14a that is preferably made of stainless steel and that has a back projecting cavity 14b. Within the cavity is inserted a piezoelectric element 14c that has an outer electrode 14d and an inner electrode 14e. The cavity is sized so that the outer electrode 14d tightly fits against the cavity wall and the forward end of the cavity as shown in FIG. 4. By providing a tight fit, the piezoelectric element is maintained in a prestressed condition so that the element is at its maximum sensitivity. Thus, when the impact head 14a touches or scrapes against an obstacle from any direction, the touching or scraping immediately vibrates the piezoelectric element 14c which then causes the element to produce electrical oscillations.

Behind the back end of the piezoelectric element within the cavity 14b is tightly fitted the front end of a flexible housing 16. The housing is comprised in part, of a coaxial cable 16a that includes an inner electrical conductor and an outer shield conductor. At the front end of the cable the inner conductor 16b is attached to the inner electrode 14e and the shield conductor 16c to the outer electrode 14d of the piezoelectric element 14c. The back end of the coaxial cable is attached to the cable assembly 18 that attaches to the input of the amplifier circuit 40 of the electronics control unit 30 as described infra. The cable assembly is preferably made integral with the back end of the flexible housing 16 with the other end of the cable having a connector 19 that mates with a corresponding connector 32 on the electronics control unit 30.

In the preferred embodiment to facilitate the assembly of the obstacle detector assembly 12, the inner conductor is attached to the inward apex of a folded leaf spring 16d. The spring is sized to frictionally fit into the head cavity 14b of the impact head. The leaves of the spring tightly press against the wall of the inner electrode 14e as shown in FIG. 4, to provide the inner conductor with an electrical connection. Likewise, the shield conductor 16c is attached to a coil spring 16e that is inserted into the head cavity 14b as also shown in FIG. 4. The coil spring presses against the wall of the head cavity to allow the shield conductor to make an electrical connection with the outer electrode 14d via the impact head wall. The flexible housing 16 is constructed with a shrink tube 16f that is placed around the coaxial cable. A flexible metal shield 16g is then placed around the shrink tube to add strength to the assembly.

Finally, a resilient cover 16h preferably made of a durable plastic or rubber material is placed around the flexible steel shield to provide water proofing and additional structural integrity. To complete the assembly, a water sealing grommet 14f is located within and near the back end of the impact head 14a. The grommet interfaces with the ends of the flexible housing and is located around the coaxial cable.

Figure 6A:
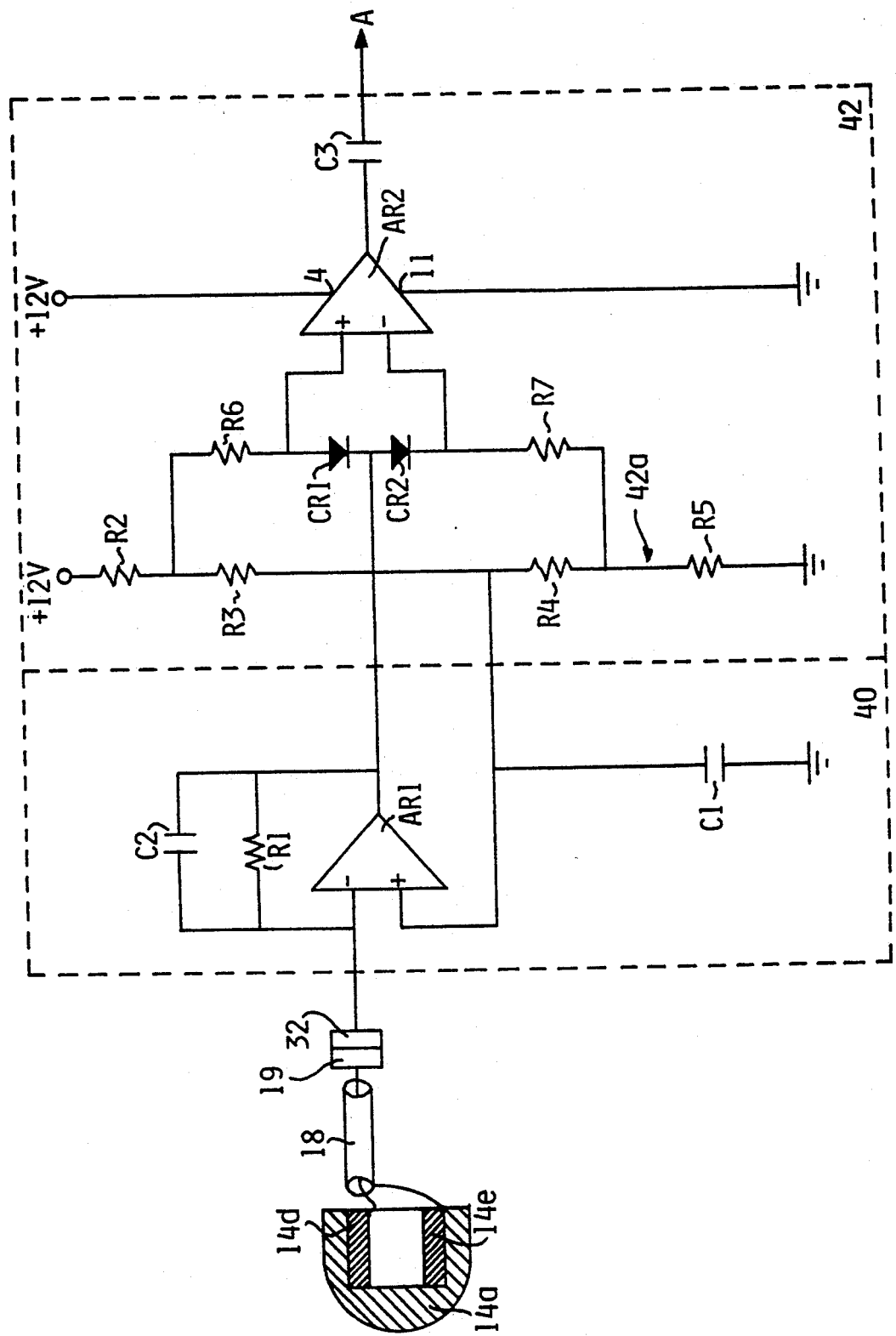
FIGS. 6A and 6B is a schematic diagram of the obstacle detector and alarm system.
Figure 6B:
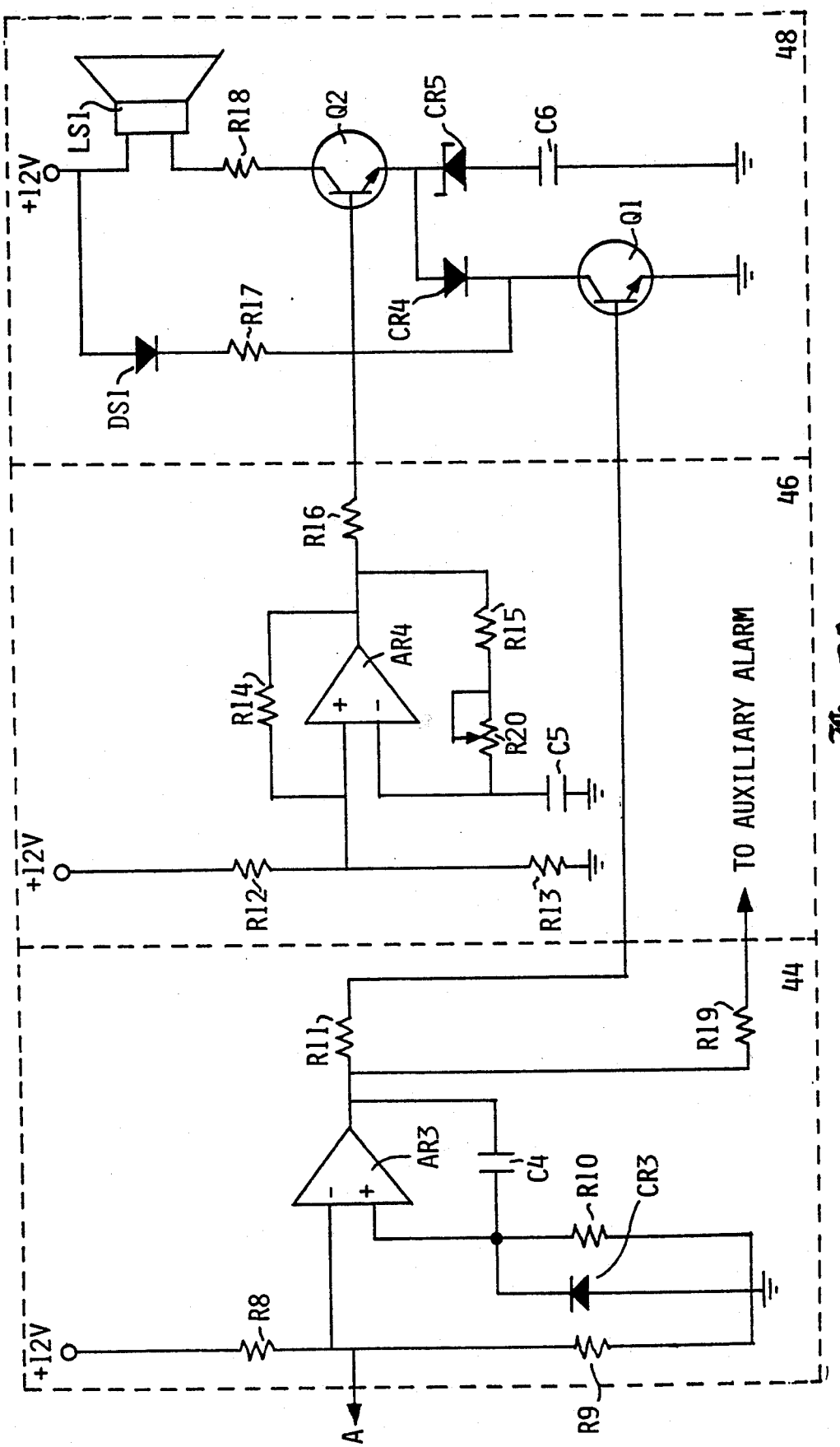

The discussion that follows is applicable to the electronics control unit 30 as shown in block form in FIG. 1 and which is primarily described with reference to the schematic of FIGS. 6A and 6B. The unit 30, employs four operational amplifiers AR1 through AR4. In the preferred embodiment, these four amplifiers are integrated within a single low-power quad operational amplifier such as an LM324 manufactured by National Semiconductor.

The output oscillations from the obstacle detector assembly 12 are initially received, processed and amplified by the amplifier circuit 40 in the electronics control unit 30. Specifically as shown in FIG. 6A, the pulses are applied to the negative input of the first operational amplifier AR1. The positive input of amplifier AR1 has attached a grounded filter capacitor C1 that filters a d-c voltage derived from the junction of a voltage divider network 42a located in the comparator circuit 42 and having a first section consisting of resistors R2 and R3 and a second section consisting of resistors R4 and R5. Across the output and negative input of the first operational amplifier is a frequency compensating feedback circuit. The circuit consists of a resistor R1 that determines the coefficient of amplification and a parallel capacitor C2 that suppresses any spurious high frequency oscillations that may emanate from the obstacle detector assembly 12. The amplifier circuit 40 produces an amplified oscillating signal that corresponds to the obstructions tracked by the impact head 14d.

The comparator circuit 42 includes the second operational amplifier AR2. This amplifier has a positive input that is applied a voltage potential through a first blocking resistor R6 that is attached to the junction of resistors R2 and R3 which comprise the first section of the voltage divider 42a. The negative input of amplifier AR2 is applied a voltage potential through a second blocking resistor R7 that is attached to the junction of resistors R4 and R5 of the voltage divider network 42a. Across the two inputs of the amplifier is connected in series, a first diode CR1 and a second diode CR2. The anode of CR1 is connected to the amplifier's positive input and the cathode of the diode CR2 is connected to the amplifier's negative input. At the center junction of the two diodes is applied the oscillating output signal from the first operational amplifier AR1 located in the amplifier circuit 40.

The input to the comparator circuit is controlled by a threshold voltage that is preset to eliminate outside noises and unwanted low-amplitude oscillations produced by the impact head 14a. The threshold voltage level is determined by the first diode CR1 and the ratio of resistors R2 and R3; and the second diode CR2 and the ratio of resistors R4 and R5. When the negative excursions of the oscillating input signal from the first operational amplifiers AR1 are equal to or exceed the level of the threshold voltage, they are applied through the first diode CR1 to the positive input of the second operational amplifier AR2. When this positive input is equal to or more negative than the negative input level at amplifier AR2, a digital output is produced. Likewise, any positive excursions of the oscillating input from amplifiers AR1 that an equal to or exceed the threshold voltage level are applied through diode CR2 to the negative input of amplifier AR2. When this negative input becomes equal to or more positive than the positive input level of amplifier AR2, a digital output is produced. As long as the second amplifier AR2 is supplied with positive and negative oscillations the comparator circuit 42 produces a continuous series of digital signals.

The retriggable multivibrator circuit 44 comprises a third operational amplifier AR3 that has a negative input that is applied the series of digital signals from the comparator circuit 42 through a coupling capacitor C3. The negative input is also connected to the center junction of a voltage divider network 44a consisting of resistor R8 and R9. This network supplies a voltage potential which is more positive than the voltage potential applied to the positive input of the third amplifier AR3. Across the amplifier's output and positive input is connected an R-C time constant consisting of resistor R10 and capacitor C4. Also connected to the amplifier's positive input is a diode CR3 that quickly charges the time constant capacitor C4 when the multivibrator circuit is energized. The RC time constant sets the pulse rate of the output pulses that are produced by the multivibrator and that are applied through a first output resistor R11 to the alarm circuit 48.

The input to the alarm circuit 48 comes from both the multivibrator circuit 44 and the audio generator 46.

The audio generator comprises the fourth operational amplifier AR4 that has a positive input that is connected across a voltage divider network consisting of resistors R12 and R13. The positive input is also connected to the amplifiers output via a positive feedback resistor R14. Across the amplifier's output and its negative input is connected an R-C time constant circuit consisting of resistor R15 potentimeter R20 and capacitor C5. The potentimeter sets the time of the audio frequency pulses that are applied through a current limiting output resistor R16 to the alarm circuit 48.

The alarm circuit 48 is designed to produce both visual and audio alarm signals. The circuit as shown in FIG. 6, receives the audio input pulses from the multivibrator circuit and the output from the audio generator circuit 46. The alarm circuit 48 consists of a first NPN switching transistor Q1 having a grounded emitter and a base that receives the output pulses from the first output resistor in the multivibrator circuit 44. The collector of transistor Q1 is connected, via a resistor R17, to an LED device DS1 that produces a visual alarm. The collector of Q1 is also connected to an audio circuit consisting of a diode CR4, a zener diode CR5 and a capacitor C6 that in combination produce a bell-like sound.

The output of the audio circuit is connected to the emitter of a second NPN transistor Q2 that functions as an amplifier. To the base of the second transistor is applied the audio frequency pulses from the audio generator circuit 46 and the second transistor's collector is connected via a resistor R18 to a transducer LS1 that emits an audio frequency signal having the bell-like sound. Note, that the multivibrator circuit 44 as shown in FIG. 6B, also includes a second output resistor R19 that may be connected to an auxiliary alarm circuit as shown in FIG. 1. Alternatively, in lieu of the visual alarm DS1 the visual alarm indicator may consist of an existing automobile lamp such as a hazard lamp. In this case, the lamp would be electrically connected in series with resistor R18 and the 12 volt d-c line.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

We claim:
1. An obstacle detector and alarm system comprising:
a) at least one flexible obstacle detector assembly having means for producing electrical oscillations when said assembly touches or scrapes against an obstacle where said detector assembly comprises:
(1) an impact head having a back projecting cavity,
(2) a piezoelectric element having an outer electrode and an inner electrode, where the outer electrode of said element is tightly fitted against the cavity wall and forward end of said cavity in a prestressed condition to maintain said element in its maximum sensitivity, where when said impact head touches or scrapes against an obstacle, said piezoelectric element produces electrical oscillations, and (3) a flexible housing having a front end that is sized to tightly fit into said back cavity behind the back end of said piezoelectric element, said housing comprising a coaxial cable that includes an inner electrical conductor and an outer shield conductor, where at the front end of the cable the inner conductor is attached to the inner electrode and the outer conductor is attached to the outer electrode of said piezoelectric element, where from said obstacle detector, via said coaxial cable, are emitted the electrical oscillations.

b) an electronics control unit that is solely powered from a vehicle battery and having means for receiving and processing the electrical oscillations from said obstacle detector assembly and for providing an alarm when said assembly has encountered an obstacle, said unit comprising:

(1) an amplifier circuit having a first operational amplifier and means for receiving, processing and amplifying the electrical oscillations from said assembly and for producing an output signal, (2) a comparator circuit having a second operational amplifier and means for comparing the output signal from said amplifier circuit with a preset threshold voltage that when equalled or exceeded, produces corresponding digital signals, (3) a retriggable multivibrator circuit having a third operational amplifier and means for receiving the digital signals from said comparator circuit and for producing a signal consisting of a series of time dependent output pulses, (4) an audio generator circuit having a fourth operational amplifier and means for producing a series of audio frequency pulses, and (5) an alarm circuit that receives the output pulses from said multivibrator circuit and the audio frequency pulses from said audio generator circuit, said alarm circuit having means for converting the two inputs into visual and audio alarm signals that indicate when said obstacle detector assembly has encountered an obstacle.

2. The system as specified in claim 1 wherein said flexible housing further comprises:
a) a shrink tube placed around said coaxial cable,
b) a flexible steel shield placed around said shrink tube, and
c) a resilient cover placed around said flexible steel shield.

3. The system as specified in claim 1 wherein the inner conductor of said shielded cable is attached to an inward apex of a folded leaf spring sized to frictionally fit into the back projecting cavity of said impact head, where the folded leaf spring presses against the wall of the inner electrode to provide the inner conductor of said coaxial cable with an electrical connection and where the shield conductor is attached to a coil spring that when inserted into said head cavity said coil spring presses against the wall of said head cavity to allow said shield conductor to make an electrical connection with the outer electrode.

4. The system as specified in claim 1 wherein said first operational amplifier in said amplifier circuit has a negative input that receives and processes the electrical oscillations from said obstacle detector assembly and a positive input having attached a grounded filter capacitor that filters a d-c voltage derived from a voltage divider network located in said comparator circuit, where across the output and negative input of said first amplifier is a frequency compensating feedback circuit having a resistor that determines the coefficient of amplification and a parallel capacitor that suppresses any high frequency oscillations emanating from said obstacle detector assembly, where the output of said amplifier circuit is an amplified oscillating signal corresponding to the obstructions tracked by said cavity.

5. The system as specified in claim 1 wherein said second operational amplifier in said comparator circuit has a positive input that is applied a voltage potential through a first blocking resistor attached to the junction of two resistors that comprise a first section of a voltage divider network and a negative input that is applied a voltage potential through a second blocking resistor attached to the junction of two resistors that comprise a second section of said voltage divider network, where across the two inputs of said second operational amplifier is connected a pair of series diodes where the anode of the first diode is connected to the amplifier's positive input and the cathode of the second diode is connected to the amplifier's negative input, where at the center junction of the two diodes is applied the oscillating output signal from said first operational amplifier where the signal includes both positive and negative excursions, where the input to said comparator circuit is controlled by a threshold voltage that is determined by the first diode and the junction of the two resistors that comprise the first section of said voltage divider network and the second diode and the junction of the two resistors that comprise the second section of said voltage divider network, where the threshold voltage level must be equalled or exceeded by the oscillating input signal from said first operational amplifier before said comparator produces a series of output digital signals.

6. The system as specified in claim 5 wherein when the negative excursions of the oscillating signals from said first operational amplifier are equal to or exceed the level of the threshold voltage they are applied through the first diode to the positive input of the second operational amplifier, when this positive input becomes equal to or more negative than the voltage level present at the negative input of said second amplifier a digital output is produced, likewise, when the negative input becomes equal to or more positive than the voltage level present at the positive input of said second amplifier a digital output is produced, where in each case, the output from said second amplifier consists of a continuous series of digital signals.

7. The system as specified in claim 6 wherein said first and second diodes connected across the input of said second operational amplifier provide a diode logic circuit that allows only one operational amplifier to provide the function of said comparator circuit.

8. The system as specified in claim 1 wherein said third operational amplifier in said retriggable multivibrator circuit has a negative input that is applied the digital signals from said comparator circuit through a coupling capacitor and that is also connected to a voltage divider network that supplies a voltage potential which is more positive than the voltage potential applied to the positive input of said third operational amplifier, where across the output and positive input of said third operational amplifier is connected an R-C time constant circuit and a diode that quickly charges the time constant capacitor when said multivibrator circuit is energized, where said R-C time constant sets the pulse rate of the output pulses produced by said multivibrator circuit and applied through a first output resistor.

9. The system as specified in claim 8 wherein said retriggable multivibrator circuit further comprises a second output resistor that produces an output that is applied to an auxiliary alarm circuit that is similar to said alarm circuit.

10. The system as specified in claim 1 wherein said fourth operational amplifier in said audio generator circuit has a positive input that is connected across a voltage divider network and to the fourth operational amplifier's output via a positive feedback resistor, where across the fourth operational amplifier's output and its negative input is connected an R-C time constant circuit that incorporates a potentiometer that allows a series of output audio frequency pulses to be set and applied through a current limiting output resistor.

11. The system as specified in claim 1 wherein said alarm circuit that produces both visual and audio alarm signals is comprised of a first NPN switching transistor having a grounded emitter and that receives at its base the output pulses from the first output resistor in said multivibrator circuit, where the transistor's collector is connected, via a resistor, to an LED device and where the collector is also connected to an audio circuit consisting of a diode, a zener diode and a capacitor that in combination produce a bell-like sound, where the output of said audio generator circuit is connected to the emitter of a second NPN transistor that functions as an amplifier, where the base of the second transistor is applied the audio frequency pulses from said audio generator circuit and where the second transistor's collector is connected via a resistor to a transducer that emits an audio frequency signal having the bell-like sound.

* * * * *